United States Patent Office 3,203,919
Patented Aug. 31, 1965

3,203,919
ACRYLIC/SILOXANE COPOLYMER, POLYSILOXANE COMPOSITION CONTAINING SAME, AND ARTICLE COATED WITH THE COMPOSITION
Armand E. Brachman, Wilmington, Del., assignor to E. I. du Pont de Nemours and Company, Wilmington, Del., a corporation of Delaware
No Drawing. Filed Sept. 19, 1962, Ser. No. 224,863
8 Claims. (Cl. 260—29.6)

This invention concerns a new copolymer which may be generally designated as a copolymer of a siloxane and certain acrylic compounds. It is also concerned with a novel composition containing a mixture of the new copolymer and a polysiloxane—a composition which is useful for the finishing of fibrous sheet materials such as suedes and fabrics. It is further concerned with the resulting finished or coated article.

"Coated article" signifies the result of impregnating and/or surface coating the suede, fabric or other substrate with the composition containing a mixture of the new copolymer and a polysiloxane.

Expressed broadly, the new copolymer of this invention is an interpolymer of a monomer mixture comprising (A) about 20–80% of an alkyl ester of acrylic or methacrylic acid in which the alkyl group contains 1–6 carbon atoms;

(B) about 10–40% of a monomer of the formula $$Z - \left[ O - \underset{\underset{R}{|}}{\overset{\overset{R}{|}}{Si}} \right]_n - O - \underset{\underset{R}{|}}{\overset{\overset{R}{|}}{Si}} - R$$

wherein $n$ is an integer having a value of 1–6, R is methyl, ethyl or phenyl, and Z is (1) 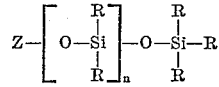

(2) 

or (3) 

wherein $R^1$ is hydrogen or methyl and $R^2$ is methyl or ethyl; and (C) about 10–40% of a monomer of the formula

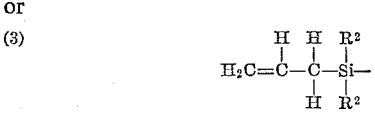

wherein $R^1$ is hydrogen or methyl, $R^3$ is the divalent aliphatic radical $C_2H_4$, $C_3H_6$, $C_4H_8$ or

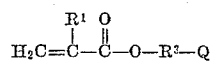

and Q is a dialkylamine radical containing a total of 2–26 carbon atoms or a 5–6 membered heterocyclic radical containing a secondary nitrogen atom; said percentages being based on the combined weight of monomers (A), (B) and (C).

The novel finishing composition of this invention is comprised of a dispersion in a volatile liquid of about 5–50% of the interpolymer described above and about 95–50% of a polysiloxane of the formula

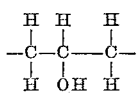

wherein $n$ is an integer having a value greater than 1, $R^4$ is hydrogen, methyl, ethyl, ethoxy or phenyl and $R^5$ is methyl, ethyl or phenyl; the percentages are based on the combined weight of the interpolymer and polysiloxane.

Ethyl acrylate and butyl methacrylate are preferred examples of the acrylate monomer designated above as monomer (A). The mixture of the three monomers can contain about 20–80% by weight of monomer (A), preferably about 40–50% by weight.

Pentamethyl disiloxanyl methacrylate is a preferred example of the siloxane monomer designated above as monomer (B); it has the formula

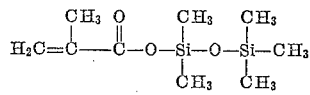

The monomer mixture used in making the new interpolymer can contain about 10–40% of monomer (B), preferably about 20–40%, based on the combined weight of monomers (A), (B) and (C).

Diethylaminoethyl methacrylate is a preferred example of the nitrogen-containing monomer designated above as monomer (C). The monomer mixture used in making the interpolymer can contain about 10–40% of monomer (C), preferably about 20–40%, based on the combined weight of monomers (A), (B) and (C).

In the definition of monomer (C), it was stated that $R^3$ of the formula can be the divalent radical

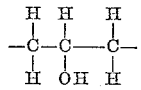

Compounds of this type are obtained by reacting one mole of glycidyl acrylate or methacrylate with, for example, one mole of diethylamine or any other amine as defined for Q of the formula.

Monomer (C) can be an ester of acrylic or methacrylic acid and a basic alcohol such as: 2-dimethylaminoethanol, 2-diethylaminoethanol, 2-dipropylaminoethanol, 2-diisobutylaminoethanol, 2-morpholinoethanol, 2-(N-methyl-N-dodecylamino)ethanol, 2 - (N - ethyl-N-octadecylamino) ethanol, 2-(N-ethyl-N-2-ethylhexylamino)ethanol, 2-piperidinoethanol, 2-pyrrolidinoethanol, 3-diethylamino-1-propanol, 1-dimethylamino-2-propanol, 4-diethylamino-1-butanol, 4-diisobutylamino-1-butanol, 1-dimethylamino-2-propanol, or 4-diethylamino-2-butanol.

The monomer mixture used in making the interpolymer can contain, in addition to the three monomers described above, a minor proportion (preferably not over 20% based on the total weight of monomers) of another monomer copolymerizable therewith, for example, butadiene, styrene, acrylonitrile, vinyl acetate or vinyl chloride.

The interpolymer is preferably prepared by emulsion polymerization, following known general practice in this technique. The interpolymer can also be prepared by known bulk and solvent techinques of polymerization.

A convenient emulsion polymerization method comprises emulsifying the monomer mixture in a water solution of a suitable surface active agent, heating the mixture under nitrogen in a conventional polymerization apparatus to about 65–85° C., adding at least 0.1% of a radical producing catalyst (e.g., hydrogen peroxide or amidine hydrochloride) based on the total weight of monomer present, and keeping the mixture at about 65–85° C. for at least an hour to complete the polymerization reaction.

The interpolymer can be converted into a salt having similar utility in finishing compositions for suedes, fabrics and the like. The conversion is accomplished by treating the interpolymer in aqueous emulsion with a water-soluble acid in quantity equivalent to the initial amine content of the interpolymer. Useful acids for this purpose include acetic, sulfuric and phosphoric.

In the preparation of the novel finishing compositions containing a blend (in a volatile liquid) of the interpolymer and a polysiloxane of the formula given previously, it is preferable to use a liquid polysiloxane when the composition is to be applied to a colored absorbent fibrous sheet material such as a suede or a fabric. This is particularly true when maximum enhancement of color depth or brilliance is desired. Useful results are also obtainable, however, with non-fluid polysiloxanes, such as silicone resins and rubbers.

When maximum water repellency is desired in the finished suede or fabric, a polysiloxane is selected which is best adapted to provide this property. An advantageous combination of water repellency and color enhancement can be obtained, for example, by using a heat-curable fluid polysiloxane having the formula

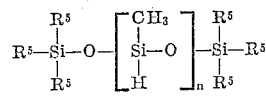

wherein $n$ is an integer having a value greater than 5 and $R^5$ is methyl, ethyl or phenyl. Preferred compositions containing about 10–30% interpolymer and 90–70% of the fluid polysiloxane, based on the combined weight of these two components.

In addition to providing water repellency, richness of appearance and brilliance of color, the polysiloxane also provides in fibrous articles finished with the novel composition improved properties related to the sense of touch, commonly referred to by such terms as "hand," "slip," or "silky feel."

It is believed that the most useful form of the finishing composition is an aqueous emulsion of the interpolymer and polysiloxane, but good results can also be obtained with a solution of the essential film forming components in a volatile organic solvent, for example, toluene, methyl ethyl ketone, or a mixture thereof. When using an aqueous emulsion, best results are usually obtained when the combined weight of interpolymer and polysiloxane makes up about 5–40% by weight of the composition.

Pigments, antistatic agents and other known additives can be added to the finishing composition.

The finishing composition can be applied to the material or article to be coated or treated by any known method, for example, by spraying, roller coating, dipping, swabbing, brushing and padding. The coated material is then dried, preferably in a heat zone.

The finishing composition is very useful for making colored fibrous sheet materials more water repellent, richer in appearance, deeper or more brilliant in color, and more pleasant to the sense of touch. It is also useful on yarns and other fibrous articles not in the form of a sheet. The term "fibrous sheet materials" is intended to include, for example, fabrics (woven and nonwoven) and waterleaves (fibrous sheets made by papermaking methods) made of natural and synthetic fibers, leather, and suedes (both natural and man-made). Similar advantages are obtainable when the finishing composition is applied to non-fibrous, porous or cellular polymeric sheet materials.

The finishing composition has the advantage of being easy to apply by conventional coating methods and easy to dry or set at temperatures which are harmless to the articles being coated.

The examples which follow are given for the purpose of illustrating the invention. All quantities shown are on a weight basis unless otherwise indicated.

Example 1

A monomer mixture is prepared by stirring together 66.7 parts of distilled ethyl acrylate, 50.0 parts of distilled pentamethyl disiloxanyl methacrylate and 50.0 parts of distilled diethylaminoethyl methacrylate.

A polymerization apparatus comprising a glass reaction vessel with anchor stirrer, thermometer, addition funnel with bypass, condenser and nitrogen inlet is charged with a mixture composed of 42 parts of the monomer mixture, 470 parts of distilled water, 2 parts of 5 molar ammonium hydroxide, 3.4 parts of a nonionic surface active agent of the octyl phenyl polyglycol ether type ("Triton" X-100 from Rohm & Haas Company) and 7.6 parts of an anionic surface active agent of the sodium alkyl aryl polyether sulfate type ("Triton" 770 from Rohm & Haas Company. The remainder of the monomer mixture (124.7 parts) is placed in the additional funnel.

The mixture in the reaction vessel is heated under nitrogen at 65° C. while stirring and adding 0.34 part of polymerization initiator and then gradually adding the remainder of the monomer mixture over a period of 30 minutes. The initiator is amidine hydrochloride; it is dissolved in 30 parts of distilled water before it is added to the reaction vessel. The mixture is maintained at a temperature of 65° C. for an additional 2 hours while under nitrogen and with moderate stirring. Then the mixture is cooled to 35° C. under nitrogen, allowed to stand for 16 hours, and filtered through cheesecloth to remove any coagulum that has formed.

The filtrate is an aqueous emulsion of a 40:30:30 terpolymer of ethyl acrylate, pentamethyl disiloxanyl methacrylate and diethylaminoethyl methacrylate. The emulsion has a terpolymer solids content of 25%.

The terpolymer can be used in the resulting emulsion form as a finishing composition to enhance the properties of fabrics, suedes and the like. The terpolymer emulsion is particularly useful when blended with a polysiloxane emulsion to form a composition which can be applied to suedes, fabrics and the like to improve such properties as water repellence and brilliance of color.

The terpolymer can also be separated from the water by known methods, for example, by coagulation and drying or by spray drying, dissolved in an organic solvent, and blended with a polysiloxane solution to form compositions in which the polysiloxane has improved affinity for suedes, fabrics and the like.

Example 2

Fifty parts of the 25% terpolymer emulsion produced in Example 1 are blended in a Waring Blendor with 50 parts of a 25% aqueous emulsion of a polysiloxane. The polysiloxane emulsion is prepared by dispersing in a Waring Blendor 25 parts of a heat-curable polysiloxane fluid containing silane hydrogens in 75 parts of water. To facilitate dispersion of the polysiloxane fluid, 1.25 parts of a nonionic surface active agent is added thereto, the surface active agent being an octyl phenyl polyglycol ether containing a long ethylene oxide chain ("Triton" X-405 from Rohm and Haas Company).

The polysiloxane fluid has a viscosity of about 30 centistokes at 77° F. and it has the following formula:

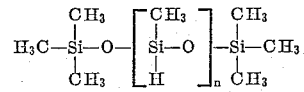

where $n$ is an integer having a value greater than 5.

Colored, man-made suede sheet material in the form of a napped polyurethane elastomer impregnated non-woven fabric is treated with the resulting composite terpolymer polysiloxane emulsion. The colored man-made suede is prepared as described in Example 1 of U.S. patent application S.N. 835,431 filed August 24, 1959, now Patent No. 3,067,483, a copending application of the assignee of the present application. The suede material is prepared in various colors, including red, green, blue, brown and black.

The composite emulsion is applied to the napped surface of the various colored lots of suede material by means of a De Vilbiss MBC spray gun using 3 passes with a wide fan spray pattern and 35 p.s.i. spray pressure. The treated suede material is then dried by passing it through a 120° C. heat zone for 10 minutes.

The suede material that has been treated with the composite emulsion has several important advantages over the untreated material. For example, the black material is a much deeper and more attractive black, and the red, green, blue and brown materials have greatly improved brilliance and attractiveness of color. Also, the treated material is found to be much more water repellent when tested by the "Spray Test" identified as Standard Test Method 22–1961 and described in the Technical Manual of the American Association of Textile Chemists and Colorists, 1961, pages 152–153. The treated material also has better properties related to the sense of touch, such as a silkier feel. In addition, dirt is less inclined to cling to the treated material, and it has better crock resistance (that is, resistance to mechanical transfer of color to an object coming in contact with the dyed material).

*Example 3*

Examples 1 and 2 are repeated except the ethyl acrylate in the monomer mixture used in making the terpolymer is replaced with butyl methacrylate. The results are similar.

*Example 4*

Examples 1 and 2 are repeated except the amino groups in the terpolymer are converted to the corresponding acetates by admixing with the terpolymer emulsion enough 5 Normal acetic acid to provide 1 mole of the acid for each mole of amino nitrogen present in the terpolymer. The results are similar to those of Examples 1 and 2. The terpolymer prepared in this example, after the acetate conversion, is also useful as a cationic dispersing agent for polysiloxanes, for example, where it is desired to incorporate a polysiloxane into an aqueous dispersion of a pigment, insecticide, chemical or another film former.

*Example 5*

Example 2 is repeated except 3 different composite emulsions are applied to separate lots of the suede material instead of the 50:50 composite emulsion of Example 2. The 3 composite emulsions are prepared by blending the terpolymer emulsion of Example 1 with the polysiloxane emulsion of Example 2 in the following ratios: (a) 33:67; (b) 20:80; and (c) 10:90. The results are similar to those of Example 2.

I claim:

1. An interpolymer of a monomer mixture comprising
 (A) about 20–80% of an ester selected from the group consisting of the alkyl esters of acrylic and methacrylic acids in which the alkyl groups contain 1–6 carbon atoms;
 (B) about 10–40% of a monomer of the formula

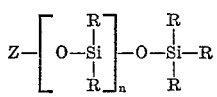

where $n$ is an integer having a value of 1–6, R is a radical selected from the group consisting of methyl, ethyl and phenyl, and Z is a radical selected from the group consisting of (1) 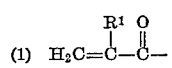

(2) 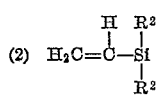

and (3) 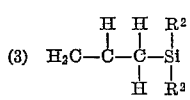

wherein $R^1$ is a radical selected from the group consisting of hydrogen and methyl, and $R^2$ is a radical selected from the group consisting of methyl and ethyl; and
(C) about 10–40% of a monomer of the formula

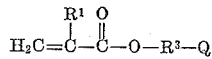

wherein $R^1$ is as defined in (B) above, $R^3$ is a divalent aliphatic radical selected from the group consisting of $C_2H_4$, $C_3H_6$, $C_4H_8$, and 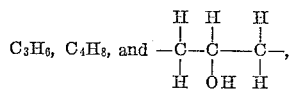

and Q is a nitrogenous radical selected from the group consisting of dialkylamine radicals containing a total of 2–26 carbon atoms and 5–6 membered heterocyclic radicals containing a secondary nitrogen atom; said percentages being based on the combined weight of monomers (A), (B) and (C).

2. An interpolymer as defined in claim 1 wherein the monomer mixture comprises about 40–50% of monomer (A), 20–40% of monomer (B) and 20–40% of monomer (C).

3. An interpolymer as defined in claim 2 wherein monomer (A) is selected from the group consisting of ethyl acrylate and butyl methacrylate, monomer (B) is pentamethyl disiloxanyl methacrylate and monomer (C) is diethylaminoethyl methacrylate.

4. A composition which comprises a dispersion in a volatile liquid of about 5–50% of the interpolymer defined in claim 1 and about 95–50% of a polysiloxane of the formula

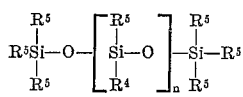

wherein $n$ is an integer having a value greater than 1, $R^4$ is a radical selected from the group consisting of hydrogen, methyl, ethyl, ethoxy and phenyl and $R^5$ is a radical selected from the group consisting of methyl, ethyl and phenyl; said percentages being based on the combined weight of said interpolymer and polysiloxane.

5. A composition which comprises an aqueous emulsion of about 10–30% of the interpolymer defined in claim 2 and about 90–70% of a fluid polysiloxane of the formula

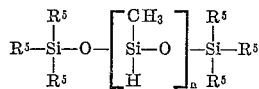

wherein $n$ is an integer having a value greater than 5 and $R^5$ is as defined in claim 4, said percentages being based on the combined weight of said interpolymer and polysiloxane.

6. A composition which comprises an aqueous emulsion of about 10–30% of the interpolymer defined in claim 3 and about 90–70% of a fluid polysiloxane of the formula shown in claim 5 wherein $R^5$ is methyl, said percentages being based on the combined weight of said interpolymer and polysiloxane.

7. A fibrous article coated with a dried layer of the composition of claim 4.

8. A suede article coated with a dried layer of the composition of claim 6.

No references cited.

MURRAY TILLMAN, *Primary Examiner.*